Patented Mar. 3, 1953

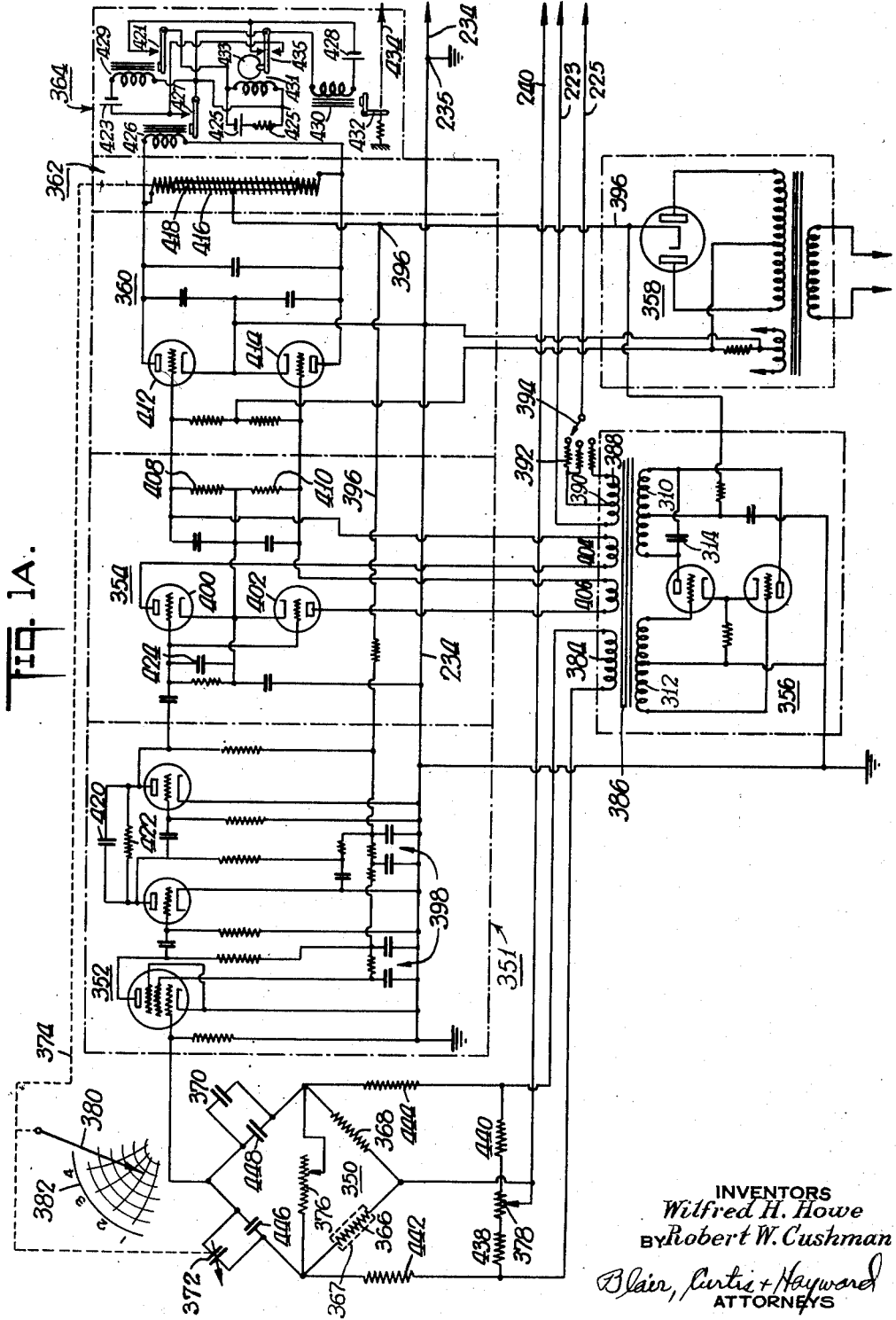

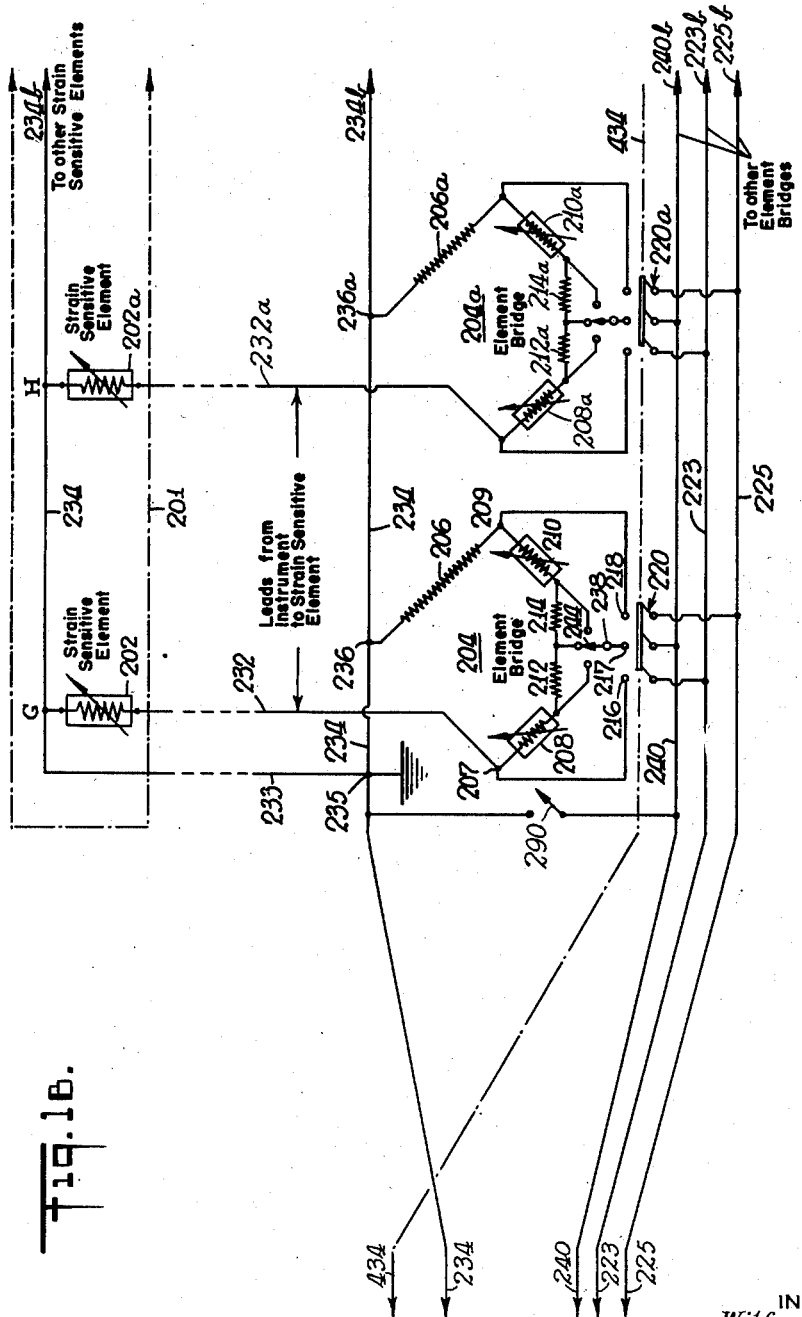

2,630,008

UNITED STATES PATENT OFFICE 2,630,008

ELECTRICAL MEASURING APPARATUS, INCLUDING A CONDITION RESPONSIVE IMPEDANCE

Wilfred H. Howe and Robert W. Cushman, Sharon, Mass., assignors to The Foxboro Company, Foxboro, Mass., a corporation of Massachusetts Original application July 28, 1943, Serial No. 496,438. Divided and this application December 28, 1945, Serial No. 637,733

11 Claims. (Cl. 73—88.5)

This invention relates to apparatus for measuring, indicating, and recording changes in the electrical characteristics of sensitive elements.

This application is a division of our co-pending application, Serial No. 496,438, filed July 28, 1943, entitled Electrical Measuring Apparatus Including a Condition Responsive Impedance.

In industry it is frequently desirable to measure the values of such conditions as temperature, pressure, flow, electrical potential, change of physical dimensions, etc., by measuring the electrical characteristics of condition sensitive elements. It is an object of the present invention to provide improved apparatus for measuring such electrical characteristics, and to provide such apparatus which is rapidly responsive to variations in such characteristics.

It is another object of the present invention to provide apparatus that, although operated from the usually available power supplies, is not susceptible to thermo-electric effects nor to pick-up from commercial A. C. power lines or other similar sources of stray electric fields.

Still another object is to measure rapidly and accurately the value of a resistive element forming part of a bridge circuit by means of a bridge-controlled motor coupled directly to a variable condenser arranged to rebalance the bridge circuit, rapid speed of rebalance being attained by the movement in unison of the condenser and the motor armature.

Other objects will be in part obvious and in part pointed out hereinafter.

In the drawings:

Figures 1A and 1B show schematically the circuit diagram of an electrical measuring system embodying the invention, and in which a self-balancing measuring and recording apparatus is provided for automatically measuring and recording in succession the values of strain measured by a plurality of mechanical strain sensitive elements. This showing is divided into the two parts, Figure 1A and Figure 1B, to permit a more expanded showing.

Referring to the drawings, an automatic self-balancing measuring and recording instrument, comprising a balancing bridge, generally indicated at 350, a suitable source of A. C. potential for energizing this bridge, generally indicated at 356, and an amplifier and phase-discriminating circuit arrangement, generally indicated at 351, all of which are included in Figure 1A, is shown connected through a selective switching mechanism, generally indicated at 220, 220a, etc., of condition sensitive element bridge circuits, shown in Figure 1B and generally indicated at 204, 204a, etc., in a "double bridge" circuit arrangement as described in our above-identified co-pending application, Serial No. 496,438, of which this application is a division.

The operation of this "double bridge" circuit arrangement is described in detail in this co-pending application but its operation will be briefly described here in order to more clearly illustrate the novel automatic self-balancing instrument embodying the present invention. The element bridges 204, 204a, etc., are substantially identical, both physically and electrically. Each of these bridges includes a condition sensitive impedance element 202, 202a, etc., whose electrical characteristics vary with the variation of some condition, such as temperature, pressure, mechanical strain, etc. Assuming an initial condition of balance in the balancing and element bridges, when a change occurs in the condition associated with the sensitive impedance element 202 of the element bridge 204 connected to the measuring instrument of Figure 1A, an unbalance potential appears across the output terminals of this element bridge. This unbalance potential is opposed to an unbalance potential produced in the balancing bridge 350 and the variable element 372 of the balancing bridge is adjusted until the unbalance potential of the balancing bridge is equal and opposite to the unbalance potential produced in the element bridge 204. This condition of balance is determined by the amplifier and phase discriminating circuit arrangement 351 and the position of the variable element 372 of the balancing bridge 350 is a measure of the change in the condition to which the sensitive impedance in the element bridge is exposed. As pointed out in our co-pending application, this balancing and measuring arrangement, identified therein as the "double bridge" system, is particularly advantageous when used to measure in succession the value of a plurality of condition sensitive elements by successively connecting them to a single master measuring instrument.

The automatic self-balancing recording instrument, shown in Figure 1A and embodying the present invention, provides mechanism for automatically adjusting the balance of the balancing bridge 350 and provides a switching mechanism for automatically sequentially operating the switches 220, 220a, etc., to connect the element bridges 204, 204a, etc., successively to the balancing bridge 350 so that a continuous record can be made of a series of mechanical strain measurements in a stressed body, generally indicated at 201, within the dotted line. It is connected to the element bridges, shown in Figure 1B, by conductors 223, 225, 234, and 240, to the correspondingly identified conductors of this apparatus, shown in Figure 1B. This automatic recording mechanism of Figure 1A may be broken down into several principal sections. There is a balancing bridge circuit, generally indicated at 350, a bridge output voltage amplifier, generally indicated at 352, a phase recognition system, generally indicated at 354, and an oscillator, generally indicated at 356. In addition, this recorder system is provided with a power supply, generally indicated at 358, adapted to be operated from the usual commercial A. C. supply line, a power amplifier stage, generally indicated at 360, operated by the output of the phase detecting circuit 354, and a balancing motor, generally indicated at 362, which is driven by the power stage 360 and operates to adjust the balancing bridge 350 by means of a variable condenser 372 to a point where the double bridge circuit is in balance. The motor 362 also moves a pen, shown schematically at 380, over a chart, shown partially and schematically at 382, to make a record of the value of the condition being measured.

There is also provided in the recorder an automatic switching relay, generally indicated at 364, operated when the double bridge system reaches a state of balance to advance the recorder chart 382 a predetermined distance to its next position so that the condition of the next element bridge to be measured may be recorded. When the recorder chart drive has advanced to this next position, the automatic switching mechanism then operates the next element bridge switch 220, 220a, etc. sequentially to connect to the balancing bridge 350 the next element bridge 204, 204a, etc. to be measured.

The balancing bridge 350 itself contains two adjacent resistance arms 366 and 368 which are connected oppositely to two adjacent capacitive arms 370 and 372, one of which, 370, is semi-adjustable and one of which, 372, includes a variable air condenser; the ratio of resistance 366 to resistance 368 being approximately equal to the impedance ratio of capacitive arm 372 with respect to arm 370. This condenser 372 is driven by the balancing motor 362 through a mechanical linkage, generally indicated by the dashed line 374, to provide the self-balancing of the balancing bridge. The balancing bridge also contains a variable resistance element to provide a "gauge factor" adjustment. This is formed of a variable resistance 376. Adjustment of this variable resistor 376 varies the resistance shunting the balancing bridge 350 and thus changes the amount of unbalance which can be produced by a given motion of the variable condenser 372, whereby the range of measurement may be changed. This range-changing adjustment permits the range of the measuring circuit to be adjusted to the "gauge factor" of the strain sensitive elements 202, 202a, etc. This "gauge factor" of the strain sensitive elements may be defined as the ratio of the percentage change in the value of their resistance to the percentage change in gauge length caused by strain in the stressed body 201. A variable resistance 378 is also provided to permit a "zero" adjustment to bring the recording pen 380 to zero on a record chart 382.

The balancing bridge 350 is energized from one winding 384 of a transformer 386 forming part of oscillator 356. This oscillator 356 may be any suitable oscillator capable of supplying an alternating current potential. In the embodiment shown in Figure 1A the oscillator is a conventional tuned plate push-pull vacuum tube oscillator in which the plate circuit coil 310 and the grid circuit coil 312 are formed of two windings of transformer 386 and are coupled together thereby. The oscillation frequency is determined by the effective inductance of winding 310, and the capacity of a condenser 314 connected in parallel thereto.

A frequency of between 500 and 2500, but preferably about 1000 cycles, has been found to be particularly effective for the operation of the instrument herein described. If frequencies below this range are used, certain operational problems are encountered. For example, if the usual commercial power supply line frequency of 60 cycles should be used, then parasitic inductive pickup from power lines may prevent effective balancing. Furthermore, such low frequencies require the use of inordinately large size circuit components in the power supply oscillator 356 as well as in any other associated equipment. On the other hand, the use of frequencies above this range, such as the upper audio-frequencies or supersonic audio-frequencies introduce the problems of leakage effects, capacity effects between various elements of the circuit, and variations due to capacity and inductive effects in the lines 233, 232, 232a, 234, etc., leading to the various strain sensitive elements attached to the structure 201 in which the strain is being measured. For example, to satisfactorily use such higher frequencies it would be necessary to use concentric cable to attach these sensitive elements to the measuring apparatus.

Another winding 388 of the oscillator transformer 386 is provided with a tap 390, a set of series resistances 392 of various values, and a single-pole multi-connection switch 394, whereby an energization voltage is supplied to the element bridges 204, 204a, etc. and with the provision for the selection of one of a plurality of ranges for the recorder. The bridge output voltage amplifier 352 in the arrangement shown is a standard resistance-capacity coupled amplifier. It is connected to the high voltage 396 of the power supply 358 through a resistance-capacity filter network, generally indicated at 398, provided to insure stability of the amplifier 352 in operation. The output of the bridge voltage amplifier 352 is fed to the phase recognition stage 354. This phase recognition circuit 354 comprises two vacuum tubes, such as the triodes 400 and 402, with their grids connected in parallel and their plate circuits separately energized by two separate windings 404 and 406, respectively, of the oscillator transformer 386. This circuit responds to the phase difference between the amplified bridge output voltage and the 1000 cycle voltage introduced from the oscillator 356 by the windings 404 and 406, so that one or the other of these two tubes 400 or 402 is energized, depending upon whether the amplifier output voltage is in phase or 180° out of phase with the voltage from oscillator 356. The energized tube passes current of a magnitude dependent upon the magnitude of the amplifier output voltage, i. e., the unbalanced voltage from the double bridge circuit. Operating in this manner, the phase recognition circuit 354 develops a D. C. voltage across one or the other of two resistors 408 and 410, which voltage is in turn impressed upon the grids of the two power tubes 412 and 414 in the power output amplifier stage 360. This stage is operated as a D. C. amplifier of conventional design. The output of the power amplifier stage 360 is used to drive the balancing solenoid motor 362 which adjusts the balancing arm of the balancing bridge 350, which arm in this instance is the variable air condenser 372. The balancing motor 362 is a center-tapped solenoid 416, the ends of which are connected to the plates of power tube 412 and 414, and the center tap of which is connected to the high voltage line 396 of power supply 358. Thus, the solenoid 416 is, in effect, a pair of co-axially mounted solenoid coils connected in push-pull. The moving part of the motor is a reciprocating cylindrical core 418 of magnetic material suspended substantially in the center of the solenoid 416. This core 418 is connected by the linkage system, shown diagrammatically by the dotted lines 374, to the rotor of the balancing bridge variable air condenser 372 and to the recording pen 380. The values of the various elements of the power amplifying stage 360 are so chosen that the driving coils of the solenoid motor 362 are continuously and equally energized by the power supply 358 through the two tubes 412 and 414 of the power output circuit. When an unbalanced voltage exists in the double bridge circuit and is amplified by the amplifier 352, the resulting amplified output unbalance from the power output stage 360 unbalances the current through both halves of the solenoid 416. The resulting magnetic unbalance of the solenoid moves the motor armature or core 418 to drive the rotor of the variable condenser 372 in such a direction as to produce an unbalance of the balancing bridge 350 equal and opposite to the unbalance of the element bridge 204, so as to reduce to zero the unbalance voltage supplied to amplifier 352 until the current through the two halves of the motor solenoid 416 again becomes equal and the core 418 stops moving. The action of the motor 362 is reversible inasmuch as the direction of movement of the core 418 depends only on the relative magnitude in the current through the two halves of solenoid 416 and is unaffected by the position of the core 418.

It is clear that no force will act on the armature 418 so long as the currents through the two halves of the motor solenoid 416 are equal, irrespective of the position of the armature 418. This is, of course, true only if the portion of armature 418 extending into each half of the solenoid motor 416 remains at all times within the region of uniform pull, that is, within the region wherein the pull exerted by the solenoid winding is substantially independent of the core position. These conditions are not difficult to realize in practice, because there is a substantial distance over which the pull is uniform. See, for example, Electrical Engineers' Handbook, Harold Pender—Editor in Chief (John Wiley & Sons, Inc., 1936), secs. 4–35 and 4–36.

To the armature 418 may be suitably attached a damping means such as a mechanical dash pot to offset any tendency of the balancing motor to oscillate across the null position when the recording mechanism is adjusted for very high sensitivity.

In order to correct any phase shift which may occur in voltage amplifier 352 and in the input of the phase recognition circuit 354, a resistance-capacity network comprising a condenser 420 and a resistor 422 is provided in amplifier 352, and a condenser 424 in the input circuit of phase recognition circuit 354, to adjust the phase of the amplified voltage so as to insure that the phase recognition circuit 354 operates effectively only on amplified unbalance voltages from amplifier 352 which are either in phase with or 180° out of phase with the voltage from the oscillator 356. Under this condition, it is affected only to a negligible extent by components of potential 90° out of phase with the oscillator voltage in a manner similar to the operation of the rectifier bridge system described in our above-identified copending application.

The automatic switching mechanism 364, mentioned above, comprises a detecting relay having a winding 426, connected in parallel with the entire winding 416 of the solenoid balancing motor 362, and a normally-open contact arrangement 427 adapted to open when the relay solenoid 426 is deenergized. The contacts 427 of relay 426 are connected in series with a power supply 423 and the winding 429 of a delayed-action relay, which is provided with contacts 421 adapted to be closed when the relay winding 429 is energized. The electric chart drive motor 431, provided for driving the record chart 382, is energized from a power supply 425 through a current limiting resistor 425'. The contacts 421 of the delayed-action relay 429 effectively are connected across this chart drive motor 431 so that operation of the motor may be controlled by closing the contacts 421 to stop the motor by short-circuiting it. The current limiting resistor 425' in series with the battery 425 is so chosen as to prevent excessive current flow when the motor 431 is shorted, but it is of sufficiently low value so as to permit the motor to start and operate satisfactorily when the short circuit is removed. This connection of the contacts 421 across the motor 431 is made through the upper contacts of a single-pole double-throw switch 435 operated by a notched cam 433 which is driven by the motor 431 at the same time that it drives the chart 382. This notched cam 433 normally holds switch 435 in one position with its upper contacts closed when the cam follower is in the notched portion of the cam, but when rotated by the motor, it moves this switch 435 to its alternate position with its lower contacts closed for a full revolution until the cam follower again drops into the notched portion of the cam 433. The two lower contacts of this switch 435 are connected in parallel with the contacts 427 of detector relay 426, as shown, so that the delayed-action relay 429 may be energized by either of these sets of contacts. In addition to completing the circuit across motor 431 through contacts 421, the upper set of contacts of switch 435 are also connected in series with a power supply 428 and a stepping switch relay electro-magnet 430, which is adapted to operate a switch-actuating mechanism, schematically shown as a biased rocker arm link 432, connected by some suitable mechanical structure, schematically shown in Figures 1A and 1B by the dashed line 434, to the element bridge switches 220, 220*a*, etc.

When the instrument is not in balance, so that the currents flowing through the two halves of the solenoid motor winding 416 are not of equal value, a potential is supplied across relay winding 426 which is sufficient to energize this relay and hold contacts 427 in closed position. Under this condition, delayed-action relay 429 is energized and its contacts 421 are closed. At this time, chart drive motor 431 is stopped because it is short-circuited through contacts 421 and the upper contacts of switch 435, the cam follower being in the notch of cam 433. At the same time the stepping relay electromagnet 430 is energized from power source 428 through the upper contacts of switch 435 to hold the stepping switch mechanism in an operated position. When the recording instrument reaches a condition of balance so that the currents flowing through both halves of the solenoid motor winding 416 are substantially equal and opposite, with the armature core 418 stationary, the potential supplied across relay winding 426 drops to a minimum value and the contacts 427 are open. This deenergizes winding 429 of the delayed-action relay because the cam follower rests in the notch of cam 433 and thus the lower contacts of switch 425 do not short contacts 427. After a brief delay interval caused by the action of the time delay of relay 429, contacts 421 open thus removing the short-circuit across the chart drive motor 431.

This motor then operates to advance the chart 332 to its next position, thereby making a record of the balance point just obtained. At the same time the motor 431 also rotates the cam 433. Thus, during the initial motion of the motor, the cam follower rides out of the notch on cam 433. This motion moves switch 435 to its alternate position, opening its upper contacts and closing its lower contacts. The opening of the upper contacts of switch 435 deenergizes the stepping switch electromagnet 430, thus placing the switching mechanism 432 in condition for the next switching operation. The closing of the lower contacts of switch 435 short-circuits contacts 427 of relay 426 which in turn reenergizes relay 429 to close its contacts 421. This closure of contacts 421 does not, however, short-circuit the motor 431 because the upper contacts of switch 435 are open due to the then position of the cam 433. As a result, when the next chart position is reached, the cam 433 having moved through one complete revolution, the upper contacts of switch 435 are closed to energize the electromagnet 430 to operate the stepping switch mechanism 432 to open the element bridge switch of the bridge just measured and to close the next switch in the series to connect its element bridge to the measuring apparatus for the next balancing operation. This closure of the upper contacts of switch 435 likewise stops the operation of the chart drive motor 431 by renewing the short-circuit thereacross through the contacts 421 of time delay relay 429.

As mentioned above, due to the time delay characteristic of relay 429, its contacts 421 are held in a closed position for a short period of time even after a balance point is reached. Thus time is assured for completion of all of the switching and recording operations just mentioned. Thus this delayed-action relay 429 holds its contacts closed for a sufficient length of time after deenergization of its winding so that there is an opportunity for relay 426 to be operated by the unbalance of a newly connected element bridge circuit, thereby closing contacts 427 and reenergizing the delay relay coil 429. This returns the circuit to its initial condition with all of the relays 426, 429 and 430 energized and motor 431 short-circuited. This condition continues until such time as balance occurs and the relay 426 is again released. Obviously, if two consecutively connected element bridges have exactly the same point of balance, relay 426 is not operated and the chart drive motor 431 will move forward one revolution to record this condition of balance at the expiration of the delay time of time delay relay 429. This time delay also provides means for preventing operation of the automatic switching mechanism in the event that the solenoid motor 362 overshoots. Such overshooting causes the instrument momentarily to go through a point of balance and this would temporarily deenergize relay 426. However, providing the time delay of relay 429 is greater than this momentary period of balance when the relay 426 is deenergized, the chart drive motor 431 will not start to operate because of this time delay effect. The sequential switching operation may be accomplished by any suitable mechanical structure known in the art. Such an arrangement might comprise a three-pole multi-throw rotary switch mounted on a shaft which is rotated from one set of contacts to the next by a step-by-step ratchet wheel actuated by the linkage 434. This ratchet wheel is operated one step each time. The electro-magnet 430 is energized as a result of the sequential operation thus described which occurs whenever a measurement balance is reached and relay coil 426 is deenergized. This mechanical switching structure does not per se form a part of the present invention. With such an arrangement as just outlined, the balancing bridge and the electronic recorder are automatically connected to the next element bridge to be measured as soon as each preceding measurement is completed.

As mentioned above, a frequency of 1000 cycles has been found to be particularly advantageous as an operating frequency with the apparatus of the present invention herein described. This is especially true when using a self-balancing instrument of the type illustrated because it permits the components of the balancing bridge 350, such as the variable capacity air condenser 372, to be of reasonable size. This would not be possible if a lower frequency such as the ordinary commercial supply line frequency of 60 cycles was used. Nor does it necessitate the use of elaborate shielding systems in the balancing bridge and amplifier structures, nor the use of co-axial cables to connect various portions of the apparatus and the condition sensitive elements, which arrangements would be necessary if higher frequencies were employed.

Considering the apparatus above described, and especially the balancing bridge 350, representative values of the electrical components which have been found to permit efficient operation are outlined below. The winding 384 of oscillator transformer 386 supplies an A. C. voltage of approximately six volts to the balancing bridge 350. This voltage is applied across a zero adjustment circuit formed of a fixed resistance 438 of about 1000 ohms connected in series with a variable zero-adjustment resistor 378 of about 2000 ohms and another fixed resistance 440 of about 1000 ohms. It also is connected to two voltage-limiting series resistors 442 and 444 of about 120 ohms each, one being connected in each line from the winding 384. The variable range-changing or "gauge factor" resistance 376 is about 50 ohms. The two fixed resistances 366 and 368 forming two arms of the bridge are substantially identical resistors of about 6 ohms each. The variable condenser 372 is variable throughout a range of about 50 to 150 micro-micro-farads and is shunted by an air dielectric tank condenser 446 of about 1000 micro-micro-farads capacity. The fourth arm of the bridge comprises another air dielectric tank condenser 448 of about 1000 micro-micro-farads capacity shunted across the semi-variable air condenser 370 which may be pre-set to bring the bridge into approximate balance at some normal null condition. These tank condensers 446 and 448 offer a sufficiently low impedance at 1000 cycles so that these two arms of the bridge each have such an impedance that they are cooperative with the other two arms of the bridge. A measuring bridge having electrical component values approximately equal to those just described has been found to work very efficiently with element bridges having approximately 120 ohms per leg, as described in our above-identified co-pending application.

Although this self-balancing electronic recorder has been described in connection with a multiple element double bridge balancing system in which a balancing bridge is unbalanced by an amount equal to the unbalance of an element bridge to measure the change in a condition, this instrument may also be used continuously to measure and indicate or record the variations in the electrical characteristic of a single condition sensitive element. If it is used in such a system, the double bridge arrangement may be dispensed with to simplify the apparatus because its ability to minimize variable contact resistance effects is not needed when the condition sensitive element can be connected to the measuring apparatus with permanent connections.

Thus, this self-balancing recorder instrument can be arranged to measure continuously the change in the value of a single condition by connecting line 234 to line 240, as by a shorting switch 299 and by substituting a condition sensitive impedance element, such as a strain gauge resistance element, for one of the bridge arm resistors 366 or 368 of balancing bridge 350, for example, resistor 366, as indicated by the dotted line 367. When unbalanced by change of the condition being measured, it is rebalanced by adjustment of the variable condenser 372 through the operation of the solenoid motor 362 as outlined in connection with the double bridge system described above. With this arrangement, the change in the value of a single condition sensitive element can be rapidly and continuously recorded on the chart 382 by the pen 380. The automatic switching arrangement 364—434 is not needed in such a system.

In the embodiment of the invention herein described, the condition sensitive impedance elements 202, 202a, etc., in the element bridges 204, 204a, etc., are strain sensitive elements associated with a stressed member. These element bridges are all energized from the A. C. source 356, as described below and in greater detail in our above-identified co-pending application and are connected to the automatic self-balancing instrument by means of the selective switching mechanism 220, 220a, etc. As mentioned in our co-pending application, any number of these element bridges may be connected successively to this instrument through wires 223, 225, 234, and 240, as indicated by the arrows 223b, 225b, 234b and 240b.

Referring now to these element bridges 204, 204a, etc., shown in Figure 1B, a stressed body 201 in which the mechanical strain is to be measured at points G, H, etc., has intimately affixed to its surface at these points strain sensitive resistance elements 202, 202a, etc. These strain gage elements, in the embodiment herein described, are resistance units so designed that, when secured to a body, change of dimension of the body to which the element is secured causes a change in the resistance of the element. Each of these strain sensitive elements 202, 202a, etc. is connected in one arm of a resistance type element bridge 204, 204a, etc. Thus the condition of balance of these element bridges is responsive to changes in mechanical dimensions. Since both of the element bridges shown in the Figure 1B are identical, the following description will be directed to bridge 204 only. In the corresponding bridge 204a, the corresponding parts are identified by the numbers used to identify the part of bridge 204 with the addition of the subscript a. It is to be understood that there may be any number of these bridges, all adapted to be sequentially connected to the remainder of the apparatus in the manner outlined in our above-identified co-pending application and to be described generally hereinafter.

One arm of element bridge 204, adjacent strain sensitive element 202, is formed of a fixed resistance 206. The two remaining arms of the element bridge 204 are formed, respectively, of two continuously and oppositely variable resistor elements 208 and 210, and two fixed resistors 212 and 214. The novel structural arrangement used continuously and oppositely to vary resistances 208 and 210 is described in detail in our above-identified co-pending application, and does not, per se, form a portion of the invention of the present application. The opposite terminals 207 and 209 of element bridge 204 are connected to sensitive element 202 and to resistor 206, respectively; and, through contacts 216 and 218 of a triple-pole, single-throw switch 220 and conductors 223 and 225, to one winding 388 of a transformer 386 connected to the A. C. power source 356 which, in the present embodiment of the invention, is the vacuum tube oscillator above described. This winding 388 supplies a suitable energizing A. C. potential to the element bridges 204, 204a, etc. The circuit connecting it thereto includes the switch 394 and the plurality of resistors 392 arranged as above described to permit adjustment of the value of this energizing potential.

One end of the strain sensitive resistor 202 is connected as shown through a line 232 to terminal 207 of element bridge 204. Its other terminal is connected through a line 233 and a circuit terminal 235 to a line 234, which is a grounded connection common to one terminal 236, 236a, etc. of all of the element bridges 204, 204a, etc. This provision of a common grounded connection to one side of all of the strain sensitive resistance elements permits the use of a large number of these elements with the measuring and recording instrument while requiring only a minimum of wires to connect these strain sensitive elements to the instrument proper. The other terminal 238 of element bridge 204, opposite terminal 236, is connected through contact 217 of the switch 220 by a line 240 to one terminal of the balancing bridge 350, which forms a portion of the automatic self-balancing measuring and recording instrument above described. This terminal 238 is adapted to be connected to one of three points in element bridge 204 by a three-point switch 244. These points are the connection points between variable resistor 208, fixed resistor 212, fixed resistor 214, and variable resistor 210, respectively. This three-point switch 244 and resistors 212 and 214 form a coarse adjustment, and oppositely and continuously variable resistors 208 and 210 form a fine adjustment for balancing the element bridge 204 when strain sensitive element 202 is in a condition of zero strain or is set at some other reference value for purposes of the measurements being made.

As various embodiments might be made of this invention, and as various changes might be made in the construction herein described, all without departing from the scope of the invention, it is to be understood that all matter herein set forth or shown in the accompanying drawings is to be interpreted as illustrative and not in a limiting sense.

We claim:

1. In apparatus of the class described, in combination, a source of A. C. power, a balanced A. C. bridge circuit energized by said source, resistance means forming part of said bridge circuit and variable in response to variations in a condition to unbalance said bridge circuit to produce an unbalance A. C. potential which is a function of the unbalance so produced, variable condenser means for rebalancing said bridge circuit, electrical motor means comprising two solenoids and armature means, means for energizing said solenoids selectively in response to the phase and proportionately to the magnitude of said unbalance potential, and means connecting said armature means to said variable condenser means to operate said variable condenser means to tend to restore said bridge circuit to balance.

2. In apparatus of the class described in combination, a source of A. C. power, a balanceable A. C. bridge circuit energized by said source, resistance means forming part of said bridge circuit and continuously variable in response to the variations in a condition to unbalance said bridge circuit to produce an unbalance A. C. potential having phase dependent upon the direction of unbalance and magnitude proportional to the extent of unbalance, variable condenser means for rebalancing said bridge circuit, electrical motor means comprising two solenoids and an armature, phase discriminating means for energizing said solenoids differentially as a function of the direction of phase displacement of said unbalance potential relative to the phase of said A. C. source, and means connecting said armature to said variable condenser means to operate said condenser means to tend to restore said bridge circuit to balance.

3. In apparatus of the class described, in combination, a source of A. C. power, a balanceable A. C. bridge circuit energized by said source, resistance means forming part of said bridge circuit and smoothly and continuously variable in response to the variations in a condition to unbalance said bridge circuit to produce an unbalance A. C. potential having phase dependent upon the direction of unbalance and magnitude proportional to the amount of unbalance, variable condenser means for rebalancing said bridge circuit, reversible solenoid motor means responsive to the direction of phase displacement of said unbalance potential relative to said A. C. source, and means connecting the armature portion of said solenoid motor means to said variable condenser means to operate it in response to the operation of said motor means to tend to restore said bridge circuit to balance.

4. Apparatus for measuring the strain in a rapidly stressed member, comprising, in combination, a source of A. C. power, a balanceable A. C. bridge circuit energized by said source, first and second resistance means forming part of said bridge circuit and being positioned in separate arms thereof, said first resistance means being mechanically attached to said stressed member to be stressed simultaneously therewith thereby to change its resistance and unbalance said bridge circuit to produce an unbalance A. C. potential which is a function of the unbalance so produced, first condenser means forming one arm of said bridge circuit, second condenser means forming a second and adjacent arm of said bridge circuit, said second condenser means being variable to rebalance said bridge circuit, electrical motor means having a movable armature substantially instantaneously responsive to said unbalance potential, means coupling said armature directly to said condenser, said coupling means being arranged to operate said variable condenser in unison with said armature to tend to restore said bridge to balance, and indicating means driven by said motor means and connected to said variable condenser means to indicate continuously the strain condition of said stressed member.

5. Apparatus for measuring the strain in a rapidly stressed member, comprising, in combination, a source of A. C. power, a balanced A. C. bridge circuit energized by said source, resistance means forming part of said bridge circuit and mechanically attached to said stressed member to be stressed simultaneously therewith thereby to change its resistance and unbalance said bridge circuit to produce an unbalance A. C. potential which is a function of the unbalance so produced, variable condenser means to rebalance said bridge circuit, electrical motor means comprising two solenoids and an armature, means for energizing said solenoids selectively in response to the phase and proportionately to the magnitude of said unbalance potential, means connecting said armature to said variable condenser means to operate said variable condenser means to tend to restore said bridge circuit to balance, and indicating means driven by said motor means and connected to said variable condenser means to indicate continuously the strain condition of said stressed member.

6. Apparatus for measuring the strain in a stressed member, comprising, in combination, a source of A. C. power, a balanced A. C. bridge circuit energized by said source, resistance means forming part of said bridge circuit and mechanically attached to said stressed member to be stressed simultaneously therewith thereby to change its resistance and unbalance said bridge circuit to produce an unbalance A. C. potential which is a function of the strain in said stressed member, a solenoid motor having first and second solenoids and a movable armature means, said solenoids being positioned to exert opposite forces on said armature, said armature means being so arranged that the armature means operate at all times within the region of substantially constant pull of said solenoids, means substantially instantaneously responsive to the movement of said armature means for restoring said bridge circuit to balance, and indicating means responsive to the position of said armature means to indicate continuously the strain condition of said stressed member.

7. Apparatus for measuring the strain in a stressed member, comprising, in combination, a source of A. C. power, a balanceable A. C. bridge circuit energized by said source, first and second resistance means forming part of said bridge circuit and being positioned in separate arms thereof, said first resistance means being mechanically attached to said stressed member to be stressed simultaneously therewith thereby to change its resistance and unbalance said bridge circuit to produce an unbalance A. C. potential which is a function of the strain in said stressed member, first condenser means forming one arm of said bridge circuit, second condenser means forming a second and adjacent arm of said bridge circuit, said second condenser being variable for rebalancing said bridge circuit, electric motor means having an armature substantially instantaneously responsive to said unbalance potential, drive means coupling said motor armature directly to said second condenser and arranged to adjust said second condenser in unison with the movement of said armature to tend to restore said bridge circuit to balance, and indicating means responsive to the value of said variable condenser to continuously indicate the strain condition of said stressed member.

8. In apparatus of the class described, in combination, a source of A. C. power, a balanceable A. C. bridge circuit energized by said source, resistance means forming part of said bridge circuit and variable in response to variations in a condition to unbalance said bridge circuit and produce an unbalance A. C. potential having a phase dependent upon the direction of said unbalance, variable condenser means for rebalancing said bridge circuit, amplifier means for amplifying said unbalanced A. C. potential, phase filter means forming part of said amplifier means, and electrical motor means responsive in direction of motion to the phase of said unbalance A C. potential only as transmitted through said filter means for operating said variable condenser means in a direction tending to restore said bridge circuit to balance.

9. In apparatus of the class described, in combination, a source of A. C. power, a balanceable A. C. bridge circuit energized by said source, impedance means forming part of said bridge circuit and smoothly and continuouly variable in response to the variations in a condition to unbalance said bridge circuit and produce an unbalance A. C. potential having a phase dependent upon the direction of said unbalance, variable condenser means for rebalancing said bridge circuit, amplifier means for amplifying said unbalance potential, phase filter means forming part of said amplifier means permitting the transmission therethrough of in-phase and out-of-phase unbalance potentials only, phase-discriminating means for producing electrical control values dependent in direction upon the phase of said unbalance potential only as transmitted through said filter means, means for impressing the output of said amplifier means and said filter means on said phase-discriminating means, and electrical motor means responsive to said control values for operating said variable condenser means in a direction tending to restore said bridge circuit to balance.

10. Apparatus of the class described comprising a source of alternating voltage, a balanceable alternating current bridge circuit energized by said source, first and second resistance means forming part of said bridge circuit and positioned in separate arms thereof, said first resistance means being variable in response to variations in a condition to unbalance said bridge circuit to produce an alternating unbalance potential, variable condenser means forming part of said bridge circuit and arranged to rebalance said circuit, electrical motor means having a movable armature under the control of said bridge circuit and responsive to the unbalance potential thereof, and means coupling said armature directly to said condenser and arranged to adjust said condenser in unison with the movement of said armature so as to rebalance said bridge circuit.

11. In a system for measuring resistance, apparatus comprising a source of A. C. power, a balanceable A. C. bridge circuit energized by said source, first and second resistance means forming part of said bridge circuit and being positioned in separate arms of said bridge circuit, said first resistance means being variable in response to variations in a condition to unbalance said bridge circuit to produce an unbalance A. C. potential having phase dependent upon the direction of unbalance and magnitude which is a function of the extent of unbalance, first and second condensers forming part of said bridge circuit and being positioned in separate arms thereof, the value of said first condenser being independent of the condition being measured and the second condenser being variable for rebalancing said bridge circuit, and electrical motor means having a movable armature responsive in direction of motion and force to the phase and magnitude, respectively, of said unbalance potential, means coupling said armature directly to said condenser arranged to operate said variable condenser means in unison with said armature to tend to restore said bride circuit to balance.

WILFRED H. HOWE.
ROBERT W. CUSHMAN.

REFERENCES CITED

The following references are of record in the file of this patent:

UNITED STATES PATENTS

| Number | Name | Date |
| --- | --- | --- |
| 1,379,266 | Keeler | May 24, 1921 |
| 1,472,125 | Keeler | Oct. 30, 1923 |
| 1,681,047 | Porter | Aug. 14, 1928 |
| 2,045,474 | Kemler | June 23, 1936 |
| 2,135,511 | Holven | Nov. 8, 1938 |
| 2,188,628 | Freystedt | Jan. 30, 1940 |
| 2,252,464 | Kearns | Aug. 12, 1941 |
| 2,255,601 | Schmitt | Sept. 9, 1941 |
| 2,329,841 | Keinath | Sept. 21, 1943 |
| 2,330,427 | Hornfeck | Sept. 28, 1943 |
| 2,338,732 | Nosker | Jan. 11, 1944 |
| 2,371,040 | Fisher | Mar. 6, 1945 |
| 2,393,669 | Wheaton | Jan. 29, 1946 |

FOREIGN PATENTS

| Number | Country | Date |
| --- | --- | --- |
| 11,765 | Great Britain | 1902 |
| 441,576 | Great Britain | Jan. 22, 1936 |